(12) United States Patent
Moulsley

(10) Patent No.: US 8,989,240 B2
(45) Date of Patent: Mar. 24, 2015

(54) METHOD FOR OPERATING A SECONDARY STATION

(75) Inventor: Timothy James Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/700,457

(22) PCT Filed: Jun. 17, 2011

(86) PCT No.: PCT/IB2011/052654
§ 371 (c)(1),
(2), (4) Date: Nov. 28, 2012

(87) PCT Pub. No.: WO2011/161601
PCT Pub. Date: Dec. 29, 2011

(65) Prior Publication Data
US 2013/0083864 A1  Apr. 4, 2013

(30) Foreign Application Priority Data
Jun. 23, 2010  (EP) ...................................... 10305674

(51) Int. Cl.
*H04B 1/38* (2006.01)
*H04L 5/16* (2006.01)
*H04B 7/04* (2006.01)
*H04B 7/06* (2006.01)
*H04L 25/03* (2006.01)

(52) U.S. Cl.
CPC ............ *H04B 7/0482* (2013.01); *H04B 7/0663* (2013.01); *H04B 7/0417* (2013.01); *H04B 7/0456* (2013.01); *H04B 7/0639* (2013.01); *H04L 25/03343* (2013.01); *H04L 2025/03808* (2013.01)

USPC ........................... 375/219; 375/259; 375/295

(58) Field of Classification Search
CPC .. H04B 7/0417; H04B 7/0456; H04B 7/0636; H04B 7/0639; H04B 7/0663; H04B 7/0634; H04L 25/03343; H04L 2025/03808
USPC ................. 375/219, 259–260, 284, 316, 358; 455/24, 69; 708/520
See application file for complete search history.

(56) References Cited

U.S. PATENT DOCUMENTS

| | | | | |
|---|---|---|---|---|
| 4,691,292 A * | 9/1987 | Rothweiler | .................... | 708/316 |
| 6,804,307 B1 * | 10/2004 | Popovic | ........................ | 375/299 |
| 7,881,247 B2 * | 2/2011 | Pan et al. | ....................... | 370/319 |
| 8,509,338 B2 * | 8/2013 | Sayana et al. | .................. | 375/267 |
| 2009/0046800 A1 | 2/2009 | Xu et al. | | |

(Continued)

FOREIGN PATENT DOCUMENTS

WO      2009023681 A2     2/2009

OTHER PUBLICATIONS

Yu et al, "On Constant Power Water-Filling", IEEE International Converence on Communications, Jun. 11-14, 2001, vol. 6, p. 1665-1669.

*Primary Examiner* — Jean B Corrielus

(57) ABSTRACT

The invention relates to a method for operating a secondary station in a communication network including a primary station, the method comprising generating a precoding matrix obtained from the Hadamard product of an alphabet modifying matrix and an original precoding matrix, wherein the original precoding matrix consist of complex coefficients of equal magnitude, transmitting a precoding report representative of the precoding matrix to the primary station.

15 Claims, 1 Drawing Sheet

(56) References Cited

U.S. PATENT DOCUMENTS

| | | | |
|---|---|---|---|
| 2010/0172430 A1* | 7/2010 | Melzer et al. | 375/267 |
| 2011/0205930 A1* | 8/2011 | Rahman et al. | 370/252 |
| 2011/0305263 A1* | 12/2011 | JÖNgren et al. | 375/219 |
| 2011/0305299 A1* | 12/2011 | Prasad et al. | 375/296 |
| 2012/0039412 A1* | 2/2012 | Geirhofer et al. | 375/267 |
| 2012/0063494 A1* | 3/2012 | Frenne et al. | 375/219 |
| 2013/0100996 A1* | 4/2013 | Clerckx et al. | 375/219 |
| 2014/0056382 A1* | 2/2014 | Jongren et al. | 375/296 |

* cited by examiner

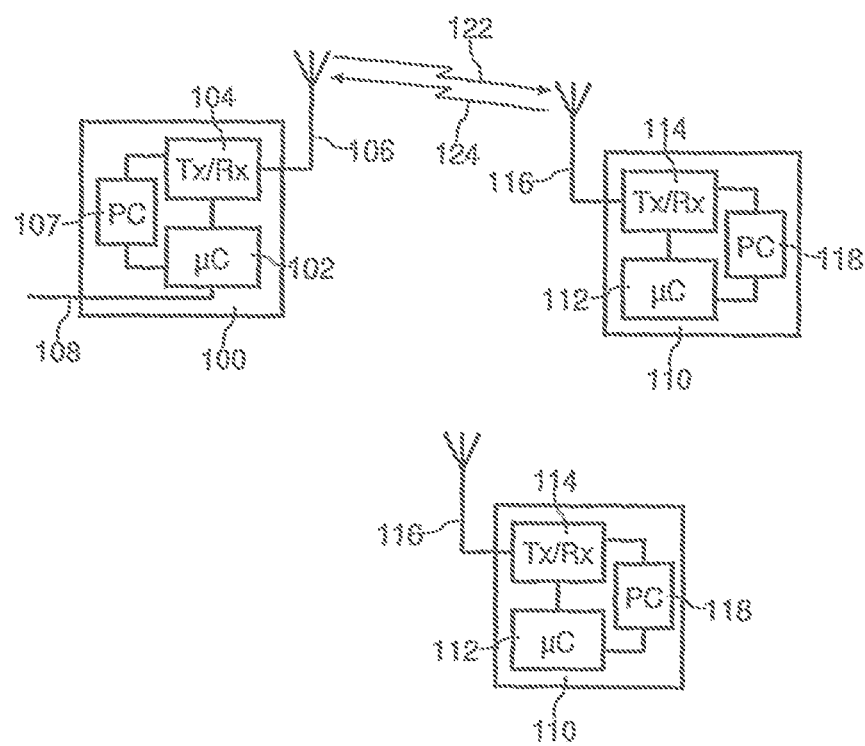

METHOD FOR OPERATING A SECONDARY STATION

FIELD OF THE INVENTION

The present invention relates a method for operating a secondary station in a communication system like a mobile communication system as LTE. In such communication systems, the stations may be able to communicate by means of MIMO transmission streams.

This invention is, for example, relevant for LTE or LTE-Advanced.

BACKGROUND OF THE INVENTION

In systems using MIMO such as LTE, the secondary station (or User Equipment or UE) can give the primary station (or base station or eNB) feedback on the downlink channel state. This can partly comprise an index to a precoding matrix selected from a codebook of matrices. Alternatively, as proposed for LTE-A, the precoder is defined by a pair of indices, each for one of two codebooks, where the precoder is derived from the matrix multiplication of the two matrices. In this case there could be more than one particular type of "matrix multiplication" that could be applied.

Typically a precoding matrix is defined such that the coefficients in column of the matrix represent the precoding coefficients applied the each transmit antenna for a given spatial channel.

A constraint on the codebook design to ensure that CQI calculation can be consistent with equal power per transmit antenna, at least with a subset of codebook entries, was proposed. This is intended to support full power amplifier (PA) utilization, where the same total output power is required for each antenna:

$$[ww^*]_{mm} = \kappa, \; m=1, \ldots, N_T$$

Where W is the overall precoder, and $N_T$ is the number of transmit antennas.

Moreover, it is possible that at least a subset of codebook entries should also have orthogonal columns with unit norm (i.e. corresponding to unitary precoding).

In the RAN1 discussion of codebook design the desirability of a restricted alphabet (e.g. QPSK (Quadrature Phase Shift Keying), 8-PSK or 16-PSK) for precoding coefficients has been mentioned. One advantage of using an alphabet based on higher order M-PSK (e.g. M=8 or 16) is that it can better match the channel characteristics that low order M-PSK (e.g. M=4). Restricting strictly to M-PSK would ensure that requirements for both full PA utilization and unit norm are automatically met for all codebook entries. There may also be some reduction in computational complexity with restricted alphabets, but it is not clear how significant this consideration would be in practice. However, it is of interest to examine what other alphabets could be beneficial (e.g. whether different amplitude values should be allowed within a precoder). In principle, an ideal precoder, even with power balancing between antennas, would require an unconstrained alphabet, but we focus here on limited alphabets.

We could consider the optimum allocation of power among the precoding coefficients as analogous to the "water filling" problem. It is well known that "constant power water filling" (i.e. allocating either zero or uniform power) is quite close to the optimal solution, assuming that unused power can be re-allocated elsewhere. This suggests that adding the possibility of "zero" to an M-PSK alphabet will achieve much of the potential benefit available from an alphabet with different amplitudes.

The general principle of setting some elements of the precoder to zero is already known.

SUMMARY OF THE INVENTION

However, other amplitude scaling factors could also be considered (e.g. in the form of APSK (Amplitude and Phase Shift Keying), of which zero amplitude is a special case). More generally, a M-QAM alphabet could be considered (i.e. a limited set of amplitudes for I and Q components.

It is an object of the invention to propose a method which alleviates the above mentioned problems.

It is another object of the invention to propose a method for operating a secondary station which permits to maintain power balancing in the precoding matrix regardless of the selected alphabet.

A method for operating a secondary station in a communication network including a primary station, the method comprising generating a precoding matrix defined as the Hadamard product of an alphabet modifying matrix and an original precoding matrix, wherein the original precoding matrix consist of complex coefficients of equal magnitude, transmitting a precoding report representative of the precoding matrix to the primary station.

As a consequence, the alphabet modifying matrix is thus enabling a power balancing of the precoding matrix.

The present invention also relates to a secondary station and primary station which comprise means for implementing the method of the first aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein:

the drawing FIGURE is a diagram representing schematically a network in which the invention is implemented.

DETAILED DESCRIPTION OF THE INVENTION

This invention relates to a mobile communication system like a 802.11, e.g. 802.11n, or a UMTS, e.g. UMTS LTE or LTE-Advanced system as illustrated on in the drawing FIGURE.

Referring to the drawing FIGURE, a radio communication system in accordance with the invention comprises a primary station (BS or eNodeB) 100 and a plurality of secondary stations (MS or UE) 110. The primary station 100 comprises a microcontroller (μC) 102, transceiver means (Tx/Rx) 104 connected to antenna means 106, being here an antenna array including a plurality of antennas and an antenna array circuit for controlling the antenna weights, power control means (PC) 107 for altering the transmitted power level, and connection means 108 for connection to the PSTN or other suitable network. Each UE 110 comprises a microcontroller (μC) 112, transceiver means (Tx/Rx) 114 connected to antenna means 116, being here an antenna array including a plurality of antennas and an antenna array circuit for controlling the antenna weights, and power control means (PC) 118 for altering the transmitted power level. Communication from primary station 100 to mobile station 110 takes place on downlink channels, while communication from secondary station 110 to primary station 100 takes place on uplink channels. In this example, the downlink channels comprise control channels. The microcontroller 112 of the secondary stations is able to generate precoding matrix for the antenna array circuit in case of MIMO communication.

As mentioned above, balanced power between the antennas is a desirable property for a transmission scheme, which allows full use of PA resources. This is probably easier to achieve with APSK than M-QAM, since a smaller number of additional amplitudes are involved.

We first examine how to achieve power balancing between antennas for an alphabet of M-PSK plus zero, it is necessary that each transmit antenna is assigned the same number of zero values (i.e. each row in the precoding matrix contains the same number of zero values). This is not a difficult constraint to satisfy for the full rank case.

For example, any number of up to $N_T$ pre-defined orthogonal patterns of zeros can be applied to the precoder. Suitable patterns could be generated by cyclic shifting of a base pattern with $N_T$ zeros. For lower transmission ranks, power balance between antennas may be achievable, but at the cost of power imbalance between layers. Note that in case the aim is moreover to achieve equal power per layer each precoding vector would need to contain the same number of zero values, but this is not necessarily an essential design requirement.

Some sets of possible zero patterns (satisfying the power balance requirement) are proposed below.

Since the same considerations for power balance apply, the same kind of patterns could be use if another amplitude factor (instead of zero) is applied (e.g. 0.5 or 1.5)

The Hadamard product can be defined as follows:

For two matrices of the same dimensions, we have the Hadamard product also known as the entrywise product and the Schur product.

Formally, for two matrices of the same dimensions:

$$A, B \in \mathbb{R}^{m \times n}$$

the Hadamard product A·B is a matrix of the same dimensions $$A \circ B \in \mathbb{R}^{m \times n}$$

with elements given by $$(A \circ B)_{i,j} = A_{i,j} \cdot B_{i,j}$$

The Hadamard product is commutative.

In a first exemplary embodiment, codebook with zero value included in the alphabet (4×4 case) are considered. In the case of rank 4 transmission for 4Tx and 4 Rx antennas, where in general, the rank 4 precoder is a 4×4 matrix.

We assume that the alphabet for the whole precoder is M-PSK plus zero, and that power balance is required between antennas. This means that each row and in the precoding vector will contain the same number of zero value coefficients. If we apply the further restriction that each precoding vector has the same number of zero value coefficients (power balancing among precoding vectors), each column will have the same number of zeros.

To generate the precoding matrix, a secondary station may use an alphabet modifying matrix. An Hadamard product is applied between the original precoding matrix, for example the M-PSK precoding matrix, and the alphabet modifying matrix.

The alphabet modifying matrix may be chosen in accordance to several criteria like one of the following:
Power balance;
Achievable data rate with the generated precoding matrix;
Transmission rank to maximise the achievable data rate;

For example, we can arbitrarily choose to keep the first elements as always non-zero. In this case, the alphabet modifying matrix may be one of the following examples, where zero patterns meet the above criteria for 1 zero per antenna. In these exemplary matrices, the blanks may be all equal to 1:—

$$\begin{bmatrix} & 0 & & \\ 0 & & & \\ & & 0 & \\ & & & 0 \end{bmatrix}, \begin{bmatrix} & 0 & & \\ 0 & & & \\ & & & 0 \\ & & 0 & \end{bmatrix}, \begin{bmatrix} & 0 & & \\ & & & 0 \\ 0 & & & \\ & & 0 & \end{bmatrix}, \begin{bmatrix} & 0 & & \\ & & & 0 \\ & & 0 & \\ 0 & & & \end{bmatrix}$$

In total there are 3×3×2=18 such patterns

If we choose to always keep the diagonal elements as non-zero, there are 9 such patterns:

$$\begin{bmatrix} & 0 & & \\ & & 0 & \\ & & & 0 \\ & 0 & & \end{bmatrix}, \begin{bmatrix} & 0 & & \\ & & & 0 \\ 0 & & & \\ & & 0 & \end{bmatrix}, \begin{bmatrix} & & 0 & \\ 0 & & & \\ & & & 0 \\ & 0 & & \end{bmatrix}, \begin{bmatrix} & & 0 & \\ & & & 0 \\ 0 & & & \\ & 0 & & \end{bmatrix},$$

$$\begin{bmatrix} & 0 & & \\ & & & 0 \\ & & 0 & \\ & 0 & & \end{bmatrix}, \begin{bmatrix} & & 0 & \\ 0 & & & \\ & 0 & & \\ & & & 0 \end{bmatrix}$$

$$\begin{bmatrix} & & & 0 \\ & & 0 & \\ & 0 & & \\ 0 & & & \end{bmatrix}, \begin{bmatrix} & & 0 & \\ & & & 0 \\ & 0 & & \\ 0 & & & \end{bmatrix}, \begin{bmatrix} & & & 0 \\ & 0 & & \\ & & 0 & \\ 0 & & & \end{bmatrix}$$

An example set of three orthogonal patterns is:

$$\begin{bmatrix} & 0 & & \\ 0 & & & \\ & & & 0 \\ & & 0 & \end{bmatrix}, \begin{bmatrix} & & 0 & \\ & & & 0 \\ 0 & & & \\ & 0 & & \end{bmatrix}, \begin{bmatrix} & & & 0 \\ & & 0 & \\ & 0 & & \\ 0 & & & \end{bmatrix}$$

From a linear combination of a set orthogonal matrices, other alphabet modifying matrices can be obtained and still maintaining the same power balancing effect.

Example zero patterns meeting the above criteria for 2 zeros per antenna are:

$$\begin{bmatrix} & 0 & 0 & \\ 0 & & & 0 \\ 0 & & & 0 \\ & 0 & 0 & \end{bmatrix}, \begin{bmatrix} & 0 & 0 & \\ 0 & 0 & & \\ & & 0 & 0 \\ 0 & & & 0 \end{bmatrix}, \begin{bmatrix} & 0 & 0 & \\ & & 0 & 0 \\ 0 & & & 0 \\ 0 & 0 & & \end{bmatrix}, \begin{bmatrix} & 0 & 0 & \\ & & & 0 \\ 0 & 0 & & \\ 0 & & & \end{bmatrix}$$

If we choose to always keep the diagonal elements as non-zero, there are 5 such patterns $$\begin{bmatrix} & 0 & 0 & \\ 0 & & & 0 \\ 0 & & & 0 \\ & 0 & 0 & \end{bmatrix}, \begin{bmatrix} & 0 & & 0 \\ 0 & & & 0 \\ & & 0 & 0 \\ 0 & 0 & & \end{bmatrix}, \begin{bmatrix} & 0 & 0 & \\ 0 & & & 0 \\ 0 & & & 0 \\ & 0 & 0 & \end{bmatrix}, \begin{bmatrix} & 0 & & 0 \\ & & & 0 \\ 0 & 0 & & \\ 0 & & & \end{bmatrix},$$

$$\begin{bmatrix} & & 0 & 0 \\ & & 0 & 0 \\ 0 & 0 & & \\ 0 & 0 & & \end{bmatrix}$$

Note that the last matrix is block diagonal, which may be suitable for cross polar arrays.

In the case that there is only one non-zero value per antenna, the actual coefficient values (and locations in the matrix) are not significant, then retaining only the diagonal elements would be sufficient.

In the case of power balancing between antennas and precoding vectors, and retaining all the diagonal elements, signalling to the UE which patterns is applied would require the following numbers of bits:

| Number zeros per antenna | Number bits required |
| --- | --- |
| Up to 1 | 4 |
| Up to 2 | 4 |
| Up to 3 | 5 |

For rank 3 and lower, truncated versions of the patterns can be used, where the unused precoding vector is set to zero e.g for rank 3

$$\begin{bmatrix} 0 & & 0 \\ 0 & & 0 \\ & & 0 \\ & 0 & 0 \end{bmatrix}, \begin{bmatrix} 0 & & 0 \\ & & 0 \\ 0 & & 0 \\ & 0 & 0 \end{bmatrix}, \begin{bmatrix} & 0 & 0 \\ 0 & & 0 \\ & & 0 \\ 0 & & 0 \end{bmatrix}, \begin{bmatrix} & 0 & 0 \\ & & 0 \\ 0 & & 0 \\ & 0 & 0 \end{bmatrix},$$

$$\begin{bmatrix} & & 0 \\ 0 & & 0 \\ 0 & & 0 \\ & 0 & 0 \end{bmatrix}, \begin{bmatrix} & & 0 \\ & & 0 & 0 \\ 0 & & 0 \\ & 0 & 0 \end{bmatrix},$$

$$\begin{bmatrix} 0 & & 0 \\ & 0 & 0 \\ & & 0 \\ 0 & & 0 \end{bmatrix}, \begin{bmatrix} & & 0 & 0 \\ & & & 0 \\ 0 & & 0 \\ 0 & & 0 \end{bmatrix}$$

Or for rank 2, unfortunately if equal power per spatial channel is required, then the power is now unbalanced between antennas.

$$\begin{bmatrix} 0 & 0 & 0 \\ 0 & & 0 & 0 \\ & & 0 & 0 \\ & & 0 & 0 \end{bmatrix}, \begin{bmatrix} 0 & 0 & 0 \\ & & 0 & 0 \\ 0 & & 0 & 0 \\ & & 0 & 0 \end{bmatrix}, \begin{bmatrix} & 0 & 0 \\ 0 & & 0 & 0 \\ & & 0 & 0 \\ 0 & & 0 & 0 \end{bmatrix}, \begin{bmatrix} & 0 & 0 \\ & & 0 & 0 \\ 0 & & 0 & 0 \\ 0 & 0 & 0 \end{bmatrix},$$

$$\begin{bmatrix} & 0 & 0 \\ 0 & & 0 & 0 \\ 0 & 0 & 0 \\ & 0 & 0 \end{bmatrix}, \begin{bmatrix} & 0 & 0 \\ & & 0 & 0 \\ 0 & & 0 & 0 \\ 0 & 0 & 0 \end{bmatrix},$$

$$\begin{bmatrix} 0 & 0 & 0 \\ & & 0 & 0 \\ & 0 & 0 \\ 0 & & 0 & 0 \end{bmatrix}, \begin{bmatrix} & & 0 & 0 \\ & & 0 & 0 \\ 0 & 0 & 0 \\ 0 & & 0 & 0 \end{bmatrix}$$

Power balance can be maintained for rank 2 transmission and 2 zero values per precoding vector. E.g $$\begin{bmatrix} 0 & 0 & 0 \\ 0 & & 0 & 0 \\ 0 & & 0 & 0 \\ & 0 & 0 & 0 \end{bmatrix}, \begin{bmatrix} 0 & 0 & 0 \\ 0 & & 0 & 0 \\ & 0 & 0 & 0 \\ 0 & & 0 & 0 \end{bmatrix}, \begin{bmatrix} 0 & 0 & 0 \\ & 0 & 0 & 0 \\ 0 & & 0 & 0 \\ 0 & & 0 & 0 \end{bmatrix}, \begin{bmatrix} & 0 & 0 & 0 \\ 0 & & 0 & 0 \\ 0 & & 0 & 0 \\ 0 & & 0 & 0 \end{bmatrix}$$

An embodiment is a system like LTE-A, where the UE indicates to the base station a preferred precoding matrix applicable for at least part of the downlink transmission band. This indication of preferred precoding vector comprises a first index to a first matrix of precoding coefficients selected from a first predetermined codebook. In the case of 4Tx antennas this could be the codebook used for MIMO in LTE Release 8. In addition the indication from the UE comprises a second index to a second matrix (selected from a second predetermined codebook) which defines a set of locations where the coefficients of the first matrix are to be modified by a specified scaling factor, the other locations being unmodified. According to different variations of the embodiment the specified scaling factor may be one of 0, 0.5 or 1.5.

In a further variation of the embodiment the indication of preferred precoding matrix from the UE also comprises a preferred transmission rank. The indication may then be constructed as a third index to a list of possible combinations of transmission rank, first index and second index.

In a further variation the contents of at least one the first and second codebooks depends on the transmission rank. As an alternative, the values in the alphabet modifying matrix may be varied in dependence on the preferred transmission rank. Similarly, the values in the alphabet modifying matrix can be changed in view of the size of the precoding matrix.

In a further variation the indication of preferred precoding matrix additionally comprises and indication of the value of the scaling factor.

In another embodiment based on LTE-A the UE indicates to the base station a preferred precoding matrix applicable for at least part of the downlink transmission band. This indication of preferred precoding vector comprises First index to a first matrix of precoding coefficients selected from a first predetermined codebook.
A second index to a second matrix (also selected from a second predetermined codebook).
A third index to a third matrix which defines a set of locations where the coefficients of the first matrix are to be modified by a specified scaling factor, the other locations being unmodified One of the first or second codebooks is associated with long term/wideband channel characteristics and the other codebook is associated with short term/narrow band characteristics.

In another embodiment based on LTE-A the UE indicates to the base station a preferred precoding matrix applicable for at least part of the downlink transmission band. This indication of preferred precoding vector comprises A first index to a first matrix of precoding coefficients selected from a first predetermined codebook.
A second index to a second matrix which defines a set of locations where the coefficients of the first matrix are to be modified by a specified first scaling factor
A third index to a third matrix which defines a set of locations where the coefficients of the first matrix are to be modified by a specified second scaling factor. The second scaling factor is different to the first scaling factor and the set of locations specified by the third index is orthogonal to the set of locations specified by the second index.

Locations which are not modified by the first or second scaling factors are unmodified The examples of the invention are focussed on complex coefficients i.e. on M-PSK. In order to apply these examples to M-QAM, the I and Q components could be treated independently in a similar manner than in the above examples.

In variations of the above embodiments the various indices may be jointly encoded together in the form of a single indication.

In another embodiment of the invention, the precoding matrix generation is also done in the primary station, for example, in an E-NodeB or a base station.

The invention has particular, but not exclusive, application to wireless communication systems such as UMTS, UMTS LTE, and UMTS LTE-Advanced, as well as wireless LANs (IEEE 802.11n) and broadband wireless (IEEE 802.16).

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a secondary station in a communication network including a primary station, the method comprising generating a precoding matrix defined as the Hadamard product of an alphabet modifying matrix and an original precoding matrix, wherein the original precoding matrix consist of complex coefficients of equal magnitude, and wherein the alphabet modifying matrix is such that the Hadamard product with any first precoding matrix comprising only coefficients which are symbols from an initial alphabet of non-zero symbols results in a second matrix which comprises only coefficients which are symbols from a modified alphabet, and transmitting a precoding report representative of the precoding matrix to the primary station.

2. The method of claim 1 wherein at least one of the alphabet modifying matrix and the original precoding matrix is selected from a predetermined codebook of matrices.

3. The method of claim 1, wherein the precoding report is representative of at least one of the original precoding matrix and the alphabet modifying matrix.

4. The method of claim 3, wherein the precoding report comprises at least one of an index representative of the original precoding matrix and an index representative of the alphabet modifying matrix.

5. The method of claim 1, wherein at least one row of the alphabet modifying matrix contains a first number of coefficients of a first value, all the other coefficients of the remaining rows being equal to a second value.

6. The method of any of claim 1, wherein at least one row of the alphabet modifying matrix contains a first number of coefficients of a first value, and a second number of coefficients of the remaining rows of a second value.

7. The method of claim 5, wherein the coefficient located at the first row and the first column of the alphabet modifying matrix has a magnitude of 1.

8. The method of claim 7, wherein all the diagonal elements of the alphabet modifying matrix have a magnitude of 1.

9. The method of claim 5, wherein the magnitude of one of the first value or the second value is one of 0, 0.5, 1, 1.5.

10. The method of claim 5, further comprising selecting of at least one of the first value and the second value in dependence of a transmission rank.

11. The method of claim 1, further comprising step (a) of the secondary station selecting at least one of the original precoding matrix and the alphabet modifying matrix which maximizes an achievable transmission rate for a subsequent communication from the primary station to the secondary station.

12. The method of claim 11, wherein step (a) comprises evaluating the achievable transmission rate for each possible pair of alphabet modifying matrix available at the secondary station and original precoding matrix available at the secondary station.

13. The method of claim 1, wherein the alphabet modifying matrix is an amplitude modifying matrix.

14. A secondary station comprising:
a processor for generating a precoding matrix defined as the Hadamard product of an alphabet modifying matrix and an original precoding matrix, wherein the original precoding matrix consist of complex coefficients of equal magnitude, and wherein the alphabet modifying matrix is such that the Hadamard product with any first precoding matrix comprising only coefficients which are symbols from an initial alphabet of non-zero symbols results in a second matrix which comprises only coefficients which are symbols from a modified alphabet, and
a transmitter for transmitting a precoding report representative of the precoding matrix to a primary station.

15. A primary station comprising:
a processor for generating a precoding matrix defined as the Hadamard product of an alphabet modifying matrix and an original precoding matrix, wherein the original precoding matrix consist of complex coefficients of equal magnitude, and wherein the alphabet modifying matrix is such that the Hadamard product with any first precoding matrix comprising only coefficients which are symbols from an initial alphabet of non-zero symbols results in a second matrix which comprises only coefficients which are symbols from a modified alphabet, and
a transmitter for transmitting a precoding report representative of the precoding matrix to a secondary station.

* * * * *